Dec. 1, 1931.    J. R. OISHEI ET AL    1,834,219
WINDSHIELD CLEANER MOTOR
Filed May 25, 1927
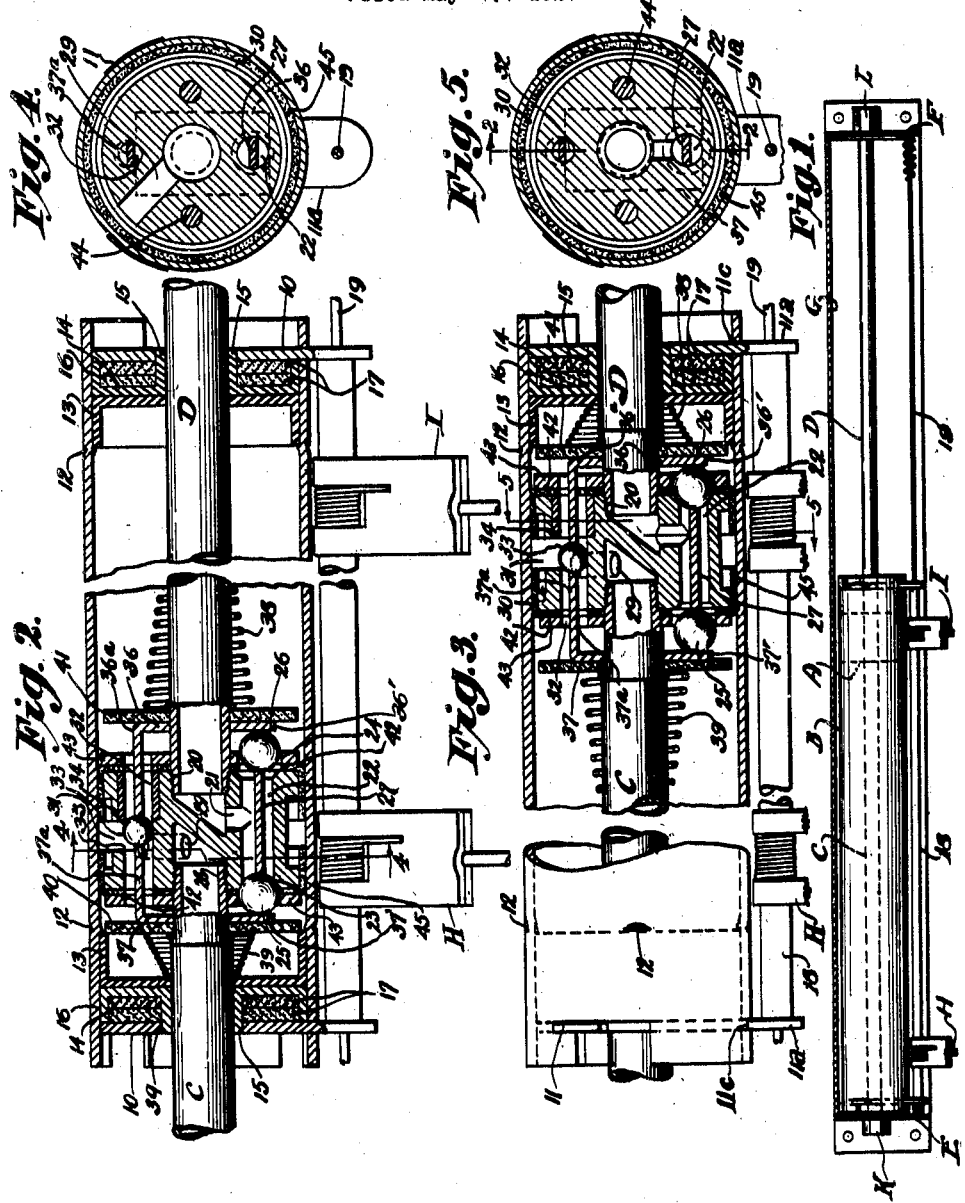
Inventor
John R. Oishei
Henry Hueber
by Barton A. Bean
   Atty.

Patented Dec. 1, 1931

1,834,219

UNITED STATES PATENT OFFICE

JOHN R. OISHEI AND HENRY HUEBER, OF BUFFALO, NEW YORK, ASSIGNORS TO TRICO PRODUCTS CORPORATION, OF BUFFALO, NEW YORK

WINDSHIELD CLEANER MOTOR

Application filed May 25, 1927. Serial No. 194,037.

This invention relates to fluid pressure motors of the type adapted to operate windshield cleaners, such as shown in the application of Henry Hueber, filed October 14, 1925, Serial No. 62,435.

Heretofore in motors of this type the construction of such motors has involved intricate and expensive machining operations and the like and certain other disadvantages have been present such as leakage of the operating fluid past the piston of the device or through the ends of the device into the piston chamber. In such cases elaborate packings have been provided in an endeavor to tightly pack the devices against leakage but such has in many cases resulted in undue friction which impairs the efficiency of the device. Further difficulties have been present in the reversing valve structures requiring accurate machining of the valves and a positive seating on double valve seats. As the devices wear, the proper spacing between these parts is often destroyed with the result of leakage or improper functioning.

The objects of the present invention are to provide a fluid pressure motor which will operate on very low pressures; and to provide improvements in a valve construction in a fluid pressure motor so as to provide positive seating valves of long life and which are not subject to leakage due to wear or erosion of the parts.

In the accompanying drawings,

Fig. 1 is a sectional elevation of a motor embodying the invention.

Fig. 2 is a section through a cylinder and piston of the motor on an enlarged scale.

Fig. 3 is a similar sectional view showing the valves in a reversing operative position.

Fig. 4 is a transverse sectional view about on line 4—4 of Figure 2, with portions of the wiper supporting means omitted.

Fig. 5 is a similar view on line 5—5 of Figure 3.

The device of this invention, generally stated, includes a fluid pressure cylinder and a piston, which is preferably adapted to operate on low pressures, as for example, atmospheric air pressure, as is utilized when the device is placed in communication with the intake manifold of an automobile engine, one of which parts is movable relatively to the other, and means for transmitting the motion of the movable part to a device or part to be operated, together with valves for automatically reversing he direction of movement of the movable part.

In the form of the invention illustrated, there is provided a fixed or stationary piston, generally designated as A, which is enclosed in a movable cylinder B. The piston A is secured to a pair of pipes or conduits C and D, in the form of the invention shown the conduit C is open at its outer end to the atmosphere and the conduit D is adapted to be open to a source of reduced pressure, such for example as the intake manifold of an automobile engine, the cylinder being provided with end members which engage the respective tubes C and D so that the cylinder is supported on the piston and on the tubes. The outer ends of the tubes C and D are preferably mounted in substantially rigid end members or brackets E and F respectively of a housing or support G, so that the cylinder is reciprocable between the end members or brackets E and F of the housing or support, the piston being provided with automatic valves for controlling the admission of air or operating fluid from the tube C to the ends of the cylinder, and the exhaust or withdrawal of air or fluid from the ends of the cylinder through the tube D.

The cylinder B is preferably constructed of a section of tubing of any desired size or weight and the invention lends itself readily to the use of a section of standard tubing for the cylinder. As illustrated, the ends of the cylinders are each provided with a detachable end or closure member 10. These end or closure members are preferably of substantially circular outline or disk-like form and are provided with one or more locking lugs or tongues 11, the end pieces being provided centrally with an aperture or opening for permitting the passage of one of the tubes C or D therethrough. These end pieces may be readily stamped at one operation out of suitable sheet metal. Certain of the locking lugs or tongues on the end pieces are preferably elongated to provide brackets or ear portions 11a for a purpose to be hereinafter referred to. In order to receive the end pieces, the ends of the cylinder are provided with an appropriate number of slots extending circumferentially of the cylinder, transversely to its axis as at 11c. These slots have openings at the end edges of the cylinder of sufficient size to receive the locking lugs on the end pieces and as illustrated in Fig. 3, the end pieces are readily connected with the cylinder by placing the end pieces with their locking lugs in the recesses or slots in the end of the cylinder and partially rotating the end pieces of the cylinder, whereupon the end pieces are detachably locked to the ends of the cylinder. The ends of the cylinder are packed against leakage preferably in the following manner. Adjacent the ends of the cylinder the cylinder walls are pressed or scored, or punched, so as to provide suitable inwardly projecting flanges or protruberances 12. Cooperating with the flanges or protuberances 12 at each end of the cylinder is a cup member 13 provided with an axial opening to receive the respective tubes C and D with side flanges the edges of which engage the flanges or protuberances 12 so that the cup member may not move inwardly of the cylinder. These cup members cooperate with the end pieces to hold the cylinder packing in place. The cylinder packing is preferably an annular channeled leather and comprises a body portion 14 which is formed with an axial opening to receive the tube C or D and an inner collar 15 substantially concentric with the tube C or D, together with an outer collar substantially concentric with the inner collar and spaced therefrom, as at 16. The free edges of the collars 15 and 16 face outwardly towards the ends of the cylinder and are preferably flexible and free to move to a slight extent against a pair of contained felt washers 17, the body portion of the leather packing member being held in place by suitable means, as by being interposed between the member 13 and the end piece 10. The cylinder ends so far described may be readily assembled by dropping the metal cup member 13 into the end of the cylinder over the tube D, for example, referring to Fig. 2, by dropping the cupped leather washer into place, together with the felt washers 17, and then by inserting the end piece 10 in place and partially rotating it, as described hereinabove, whereupon the cylinder end is assembled.

The parts or devices to be operated by the motor, in the form of the invention illustrated herein, are carried or moved by the cylinder, being mounted thereon by suitable means or in suitable manner. In the form shown, the parts to be operated are windshield wiper carrying rods H and I. These wiper carriers may, as shown, be mounted on a sleeve 18 which is carried by the end pieces 10 of the cylinder. For purposes of ready assembly, the sleeve 18 is mounted between the end pieces 10, with its ends in contact with the portions 11a of the end pieces 10, and is slidable on a wire or rod 19, the ends of this wire or rod 19 being secured in the end brackets or members E and F of the support or housing. It will thus be seen that in the preferred form illustrated, the removable end pieces of the cylinder not only serve the purpose of closing the ends of the cylinder and maintaining the packing in place, but also serve as carriers for the devices to be operated.

The outer ends of the tubes C and D are connected to the brackets E and F of the support or housing in suitable manner. As shown, these ends of the tubes are provided with screw threads which are engaged by the nuts K and L so that the tubes are held rigidly in place in the housing. In assembling the device so far described, when the end pieces of the cylinder have been placed in position, the sleeve 18 with its wiper carriers H and I is placed in position between the portions 11a of the cylinder ends and the wire or rod 19 then inserted through one end of the bracket E or F, through holes in the end pieces 10 (Figs. 4 and 5) and through the sleeve 18. The ends of the wire or rod 19 are then secured to the brackets E and F in suitable manner so as to place the wire or rod 19 under considerable tension. This makes a rigid guide for the sleeve 18.

The slots in the ends of the cylinder which are engaged by the lugs 11 of the cylinder end pieces, preferably open in opposite directions (as shown in Figs. 1, 2 and 3) so that when the end pieces are put in position on the ends of the cylinder to detachably lock them, one end piece is rotated in one direction and the other end piece is partially rotated in an opposite direction. By reason of the wire or rod 19 projecting through the holes 11b in these end pieces, when this wire or rod is in position partial rotation of the end pieces or of the cylinder is prevented due to the reverse direction insertion and removal of the end pieces.

The end packing construction for the cylinder and the supporting and guiding means for the wiper element forms the subject matter of our co-pending application filed October 14, 1925, Serial No. 62,437, of which this present application is a division.

In the form of the invention shown, the valves or means for controlling the admission of the operating fluid to the ends of the cylinder are constructed as follows:

The air exhaust tube or conduit D is provided with a reduced portion having a stop shoulder 20′ and a screw threaded end 20 engaging a threaded aperture in the piston A and the inner end of this tube or conduit D is in communication through a port 21 with a passage or port 22 which extends through the piston from one side thereof to the other. As shown in Figs. 4 and 5, this port or chamber 22 may be of cylindrical form. The port 22 is provided at its opposite ends with valve seats 23 and 24 adapted to be engaged by ball valves 25 and 26. It has been found desirable to use ball valves in constructions such as this where the pressures to operate the motor may be relatively low, as they are self centering, and being free to rotate keep the valve seats from becoming distorted and automatically adjust themselves to minor inequalities in the valve seats which might otherwise cause leakage. Further, the provision of the loose ball valves with their spacer and actuating plates takes care of any wear on the spacers, actuating plates, or valve seats by reason of the fact that if the valves are positively moved to approximate seating position, the currents of fluid through the valved passages are so directed as to complete the closure of the valves. For example in the positions of the valves shown in Fig. 2, where the valves have just changed so that air is about to be withdrawn from the right hand end of the cylinder past ball 26, if the finger 37a of valve actuating plate 37 is worn so that it does not shove ball 33 completely home on its seat 34, the movement of air past ball 33 from chamber 30 will force the ball home on its seat as air is being withdrawn behind that seat. These ball valves 25 and 26 are held in spaced relation by means of a spacing member 27 which is free to move in the port 22 and loosely connects the balls 25 and 26 of this valve structure.

The tube C is likewise provided with stop shoulder 28' and a threaded end 28 engaging a suitable threaded recess in the piston and communicates through means of a port 29 with a chamber 30. From the chamber 30 which is preferably adjacent the periphery of the piston a port 31 extends to a passage 32, which passage extends from one side of the piston to the other, and as shown in Figs. 4 and 5, is preferably in the form of a cylindrical port or passage. At its opposite ends the port or passage 32 is open to opposite ends of the cylinder and the admission of operating fluid to this port or passage is controlled by a ball valve 33 which alternately engages the valve seats 34 and 35 controlling communication between the passage 31 and the opposite ends of passage 32. The valve heads or balls 25, 26 and 33 are positively moved by means of the plate members 36 and 37. A pair of these plate members is provided, each plate member having a body portion 36', 37' with an aperture whereby it is slidable on the end of the tube C or D, and an angularly extending finger or portion 36a, 37a, which is adapted to engage the ball valve 33. The lower end of the body portions engage the ball valves 25 and/or 26. The plate members 36 and 37 are moved, preferably by means of springs 38 and 39 which are engaged by the ends of the cylinder or by the cups 13 at the ends of the cylinder as the cylinder end nears the piston during its stroke, and for purposes of preventing noise, buffing washers 40 and 41 are interposed between the springs and between the plate members 36 and 37. The action of these springs 38 and 39 is to quickly reverse the valves. As the end of the cylinder comes in contact with the adjacent spring 38 or 39 and continues to travel toward the piston, it compresses the spring until enough potential energy is built up in the spring to overcome the resistance to movement of the valves from their seats. The spring then quickly snaps the valves to the opposite position, reversing movement of the cylinder.

As illustrated in Figs. 2 and 3, the piston may be packed in the following described manner. 42 designates a pair of substantially cupped packing members of leather or other suitable material which may be secured to the piston by suitable means, as for example the removable plates 43 secured to the body of the piston by screws or attaching devices 44 so that the bodies of the packing members are clamped between the movable plates and the body of the piston. The piston packing members are provided with free edges or flanges 45 which extend toward one another along a portion of the inner wall of the cylinder in contact therewith and preferably across a portion of chamber 30 so that atmospheric air or other operating fluid being admitted to the piston tends to hold the sealing edges of the packing members in proper contact with the cylinder walls. This is accentuated by the fact that the pressures in the cylinder beyond the ends of the piston is at all times less than the pressure in chamber 30 or, for example when operating on atmospheric air, air is being withdrawn from one end of the cylinder resulting in "suction" or a pressure less than atmospheric in that end of the cylinder. This acting with the atmospheric pressure in chamber 30 tends to draw the free edge of the packing member toward the space which is being evacuated resulting in the edge of the packing member effectively contacting with the inner wall of the cylinder to seal it and the greater the differential in pressures the greater the seal.

As illustrated in Fig. 2, the cylinder has been traveling in a right-hand direction and the left hand end of the cylinder has approached the fixed piston, compressing the spring 39, whereupon the plate member 37 has been moved, forcing the ball valve 33 against the seat 34 and forcing the ball 25 against the seat 23 and removing the ball 26 from the seat 24. The action of the plate members 37 is limited by the engagement of the washer 41 with the stop shoulder 20' of the tube C, during this operation. In these positions of the valves, atmospheric air entering through tube C and passing through port 29 to chamber 30, passes through port 31, past valve seat 35 into the left hand end of the cylinder at the left hand side of the piston. At the same time air is withdrawn from the right hand end of the cylinder, past ball valve 26 and valve seat 24 through port 21 and through the exhaust tube D. The cylinder then moves to the left until the right hand end of the cylinder compresses spring 38, as shown in Fig. 3, whereupon the valves are shifted to the positions shown in that figure, and thereupon the application of atmospheric air and the exhausting influence is reversed and in the position of the valves shown in Fig. 3, atmospheric air will be admitted through tube C, port 29, chamber 30, port 31, passage 32 to the right hand end of the cylinder at the right hand side of the piston and the air will be withdrawn through tube D, port 21, passage 22, past valve 25 and valve seat 23 from the left hand end of the cylinder. The cylinder thereupon starts on its stroke towards the right where the reverse of the action described is performed whereupon the washer 40 strikes the stop shoulder 28' to limit the movement of the plate member 37 to the left. It will be seen that as long as an air exhausting influence is applied through the tube D, the operation or movement of the cylinder will be automatic, moving first in one direction and then in the other.

Having described the operation of the valves, the operation of the packing members at the ends of the cylinder may now be more clearly understood. With the valves positioned as in Fig. 2, so that air is being withdrawn from the right hand side of the cylinder at the right hand side of the piston, it will be understood that there is a lowered pressure condition in this right hand side of the cylinder, that is during the process of withdrawal the air in that side will be less than atmospheric pressure. At the same time at the outside of the cylinder the free normal atmospheric pressure is being applied so that there is a tendency to draw the ends of the collars 15 and 16 of the packing leathers inwardly of the cylinder. This results in these ends of the collars of the packing leathers bearing tightly upon the inner side of the cylinder wall in the case of collar 16 and upon the tube D in the case of collar 15, with the result that there is no leakage of atmospheric air from outside of the cylinder into the chamber being evacuated which would interfere with or impair the efficiency of the device. It will be understood that as this packing leather becomes worn it has greater movement and greater flexibility and that its sealing action is practically automatic, the edges of the leather being moved by the forces operating within and without the cylinder. In cases where the evacuation of the cylinder is not very rapid and there is no great lowering of pressure within that end of the cylinder, as where the vacuum available for operation is very small, the edges of the leather collars are not forced against the cylinder walls or against the tube so tightly, therefore there is less friction from these packing leathers than there is when there is a large amount of power available and the device is constructed so as to operate under very low pressures and still provide an effective seal. By reason of the form and arrangement of these packing leathers in case greater power is applied more friction at this point can be absorbed and this packing will still provide against leakage under such greater power influences. Referring to the position of the valves in Fig. 3, it will be noted that atmospheric air is being admitted to the right hand side of the cylinder at the right hand side of the piston through the tube C, port 29, chamber 30, port 31, and passage 32. So we have a condition at the right hand side of the cylinder where atmospheric pressure is being built up at the inner faces of the packing leathers and the normal free atmospheric pressure is being applied at the outside. In such condition there is no leakage past the packing leathers for the reason that the pressure being applied within the right hand end of the cylinder could not slip out along the tube D or along the inner side of the cylinder walls past the collars of the packing for the reason that it is opposed on the outside of the cylinder by the free atmospheric pressure which is as great, if not greater, than the pressure being applied within the cylinder.

We claim as our invention:—

1. In a fluid pressure motor, a cylinder, a piston in said cylinder, a fluid admission conduit, a fluid exhaust conduit, an admission passage connecting the fluid admission conduit with the ends of the cylinder at opposite sides of the piston, an exhaust passage connecting the fluid exhaust conduit with the ends of the cylinder, a pair of valve seats in said admission passage, a ball valve interposed between said seats for operatively engaging the same in alternation, a pair of valve seats in said exhaust passage, a pair of balls arranged to contact with the valve seats of one of said passages and constituting valves, a spacer part interposed between said balls and loosely engaging said balls whereby when one of said balls is moved, the other of said balls is shifted, said spacer part being supported independently of said balls, and means for moving said balls.

2. In a fluid pressure motor, a cylinder, a piston in said cylinder, a fluid admission conduit, a fluid exhaust conduit, an admission passage connecting the fluid admission conduit with the ends of the cylinder at opposite sides of the piston, an exhaust passage connecting the fluid exhaust conduit with the ends of the cylinder, a pair of spaced valve seats in said admission passage, said valve seats facing one another, a ball interposed between said valve seats and movable from one seat to the other for selectively closing the ends of the cylinder to the admission passage, a pair of valve seats in said exhaust passage, said exhaust valve seats opening in opposite directions, a pair of balls, one ball cooperating with one of said exhaust valve seats and the other ball cooperating with the other of said exhaust valve seats for selectively closing the ends of the cylinder to the exhaust passage, a spacer member freely engaging said exhaust valve balls and guided on said conduits, whereby when one ball is moved to its seat the other ball is removed from its seat, said balls being independently rotatable relative to said spacer member, and means for simultaneously shifting the admission valve ball from one of its seats to the other as the exhaust valves are shifted.

3. In a fluid pressure motor, a cylinder, a piston in said cylinder, a fluid admission conduit in communication with said piston, an admission passage in said piston adapted to connect the ends of the cylinder with said admission conduit, a fluid exhaust conduit, an exhaust passage, valves and valve seats in said passages for controlling the connection of said passages with the ends of said cylinder, said fluid admission passage communicating with a chamber in said piston adjacent the periphery, a pair of packing members on said piston, said packing members having free end portions extending a distance along the inner side of said cylinder in contact therewith, said free ends extending toward one another partially across said peripheral chamber whereby the free ends of said packing are at all times subjected to the pressure of the fluid in said admission passage.

4. In a fluid pressure motor, a cylinder, a piston therein, a fluid admission conduit extending from one side of the piston, a fluid exhaust conduit extending from the opposite side of the piston, a pair of independent passages extending through the piston from one side to the opposite side thereof, one passage having oppositely facing valve seats and communicating with one conduit from between said seats, a pair of ball valves for said seats, the other passage having opposed valve seats and communicating from between them with the other conduit, a single ball valve interposed between said opposed seats for alternately cooperating therewith, each conduit having a stop shoulder, and a valve actuating member mounted on each conduit between the respective stop shoulder and the piston for limited movement to seat the respective valve of said pair and for engaging said single valve with a respective one of its seats, said valve actuating members functioning in alternation and being slidable on their respective conduits by and during relative movement between the piston and cylinder.

5. In a fluid pressure motor, a cylinder, a piston therein, a fluid admission conduit extending from one side of the piston, a fluid exhaust conduit extending from the opposite side of the piston, a pair of independent passages extending through the piston from one side to the opposite side thereof, one passage having oppositely facing valve seats and communicating with one conduit from between said seats, a pair of ball valves for said seats, the other passage having opposed valve seats and communicating from between them with the other conduit, a single ball valve interposed between said opposed seats for alternately cooperating therewith, and a valve actuating plate slidably mounted on each conduit for seating the respective valve of said pair, each plate having an angular extension guidingly received by said other passage for engaging said single ball valve to shift the same from one to the other of said opposed seats.

6. In a fluid pressure motor, a cylinder, a piston therein, a fluid admission conduit extending from one side of the piston, a fluid exhaust conduit extending from the opposite side of the piston, a pair of independent passages extending through the piston from one side to the opposite side thereof, one passage having oppositely facing valve seats and communicating with one conduit from between said seats, a pair of ball valves for said seats, the other passage having opposed valve seats and communicating from between them with the other conduit, a single ball valve interposed between said opposed seats for alternately cooperating therewith, a valve spacing member slidably arranged in said first specified passage and acting to unseat one valve of said pair when the companion valve is seated, a valve actuating plate movably mounted on each side of the piston independently of said ball valve for limited movement, said plates acting to hold said pair of valves against displacement and to effect seating thereof, and valve actuating means shiftable by said plates in said other passage and engaging opposite sides of said single ball valve for moving the same to and from its opposed seats.

JOHN R. OISHEI.
HENRY HUEBER.